This invention relates to improved apparatus for developing an elongated strip of film, such as motion picture film, in a continuous type developing process. The apparatus of the present invention is an improvement on that disclosed in my co-pending application Serial Number 775,801, filed November 24, 1958, on "Film Developing Apparatus."

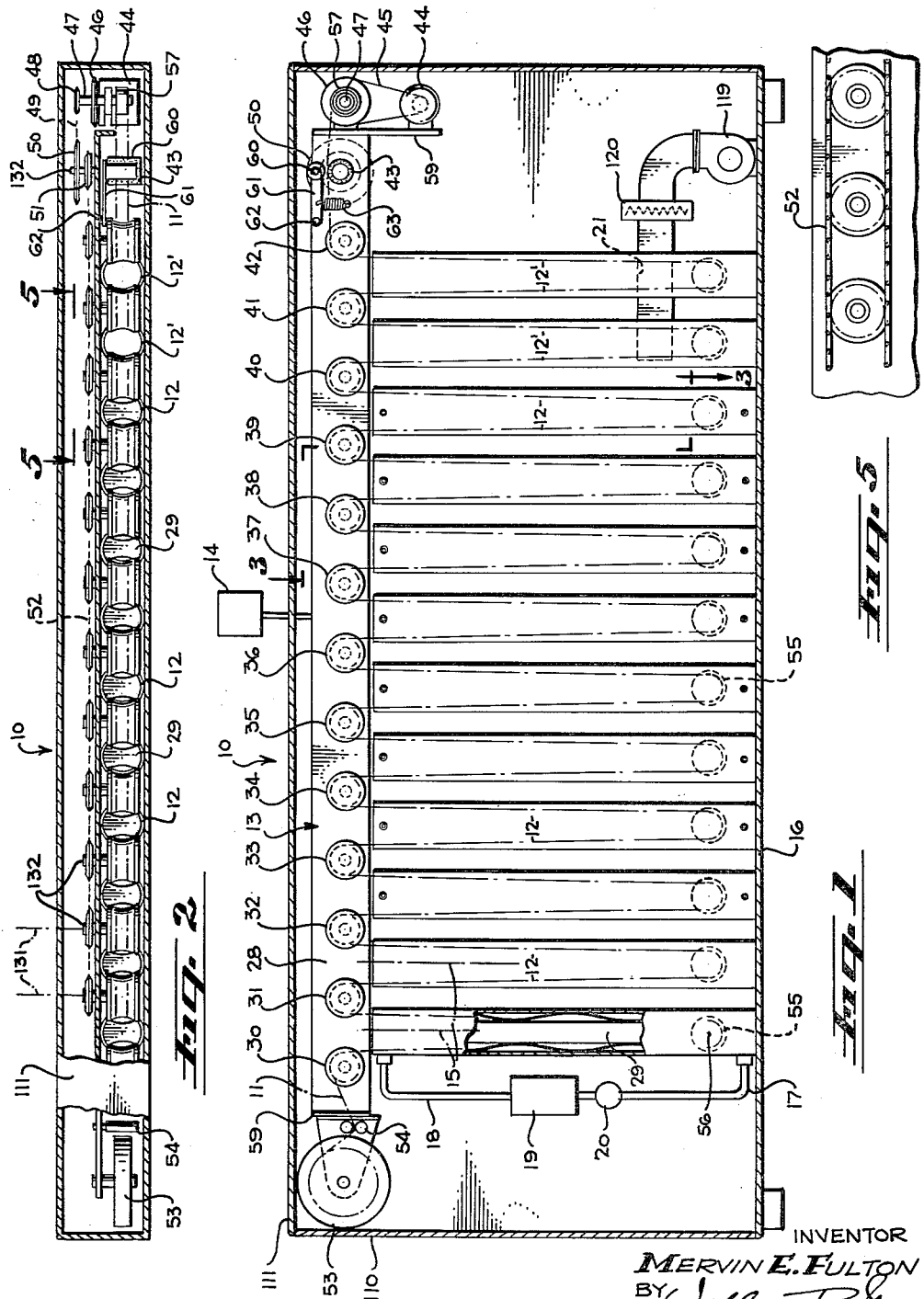

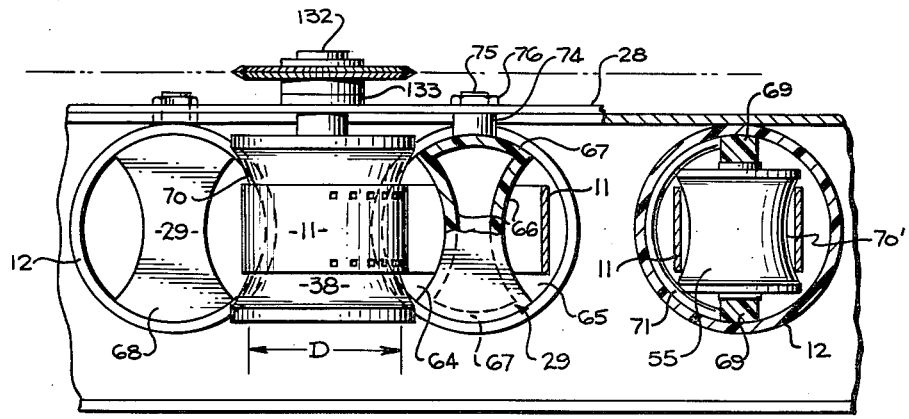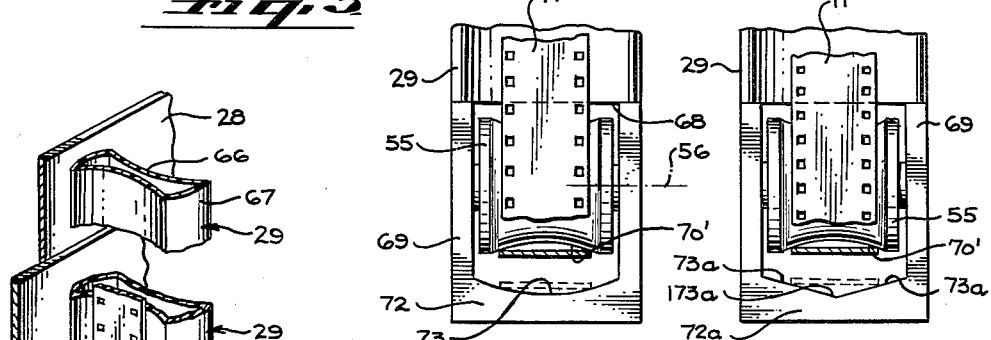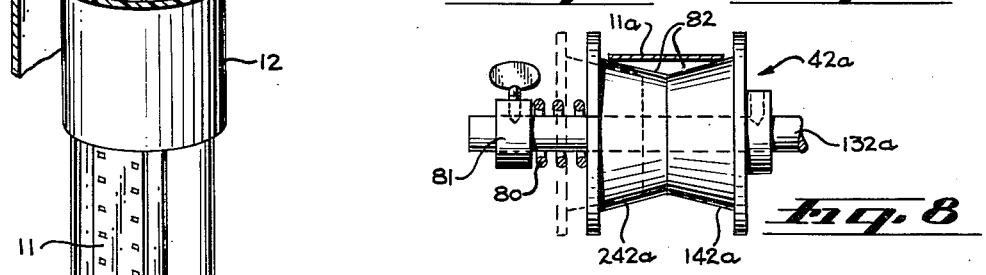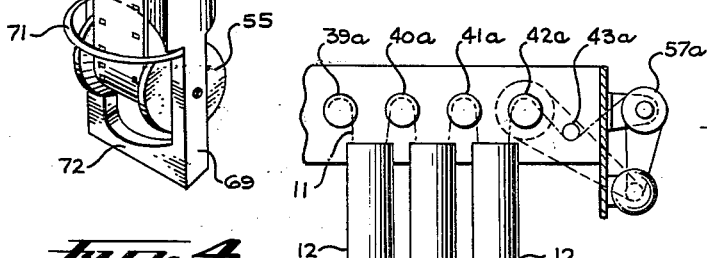
INVENTOR
MERVIN E. FULTON
BY William P. Green
ATTORNEY 3,043,206
TENSION-FREE FILM DEVELOPING APPARATUS
Mervin E. Fulton, 3461 E. Tulare Ave. (P.O. Box 980),
Tulare, Calif.
Filed Sept. 13, 1960, Ser. No. 55,787
12 Claims. (Cl. 95—94)

In a continuous developing process, an elongated strip of film is advanced progressively along a predetermined path, and through such developing, fixing, rinsing, and drying chambers as may be required for completely developing the film. The film is usually directed along this often circuitous path by means of a series of rollers, at least some of which are power driven. In the apparatus of the above identified application, the rollers direct the film alternately downwardly and then upwardly through a series of successive tanks, containing the required film treating solutions, with the final tanks being adapted to dry the film just prior to its advancement onto a takeup reel.

One problem which has heretofore been encountered in apparatus of this general type is the problem of preventing the development of excessive tension on the film at the locations of the various rollers, since any such tension may have very decided adverse effects on the film, resulting from stretching of the film base or distortion or bending of the edges of the film. Any such damage to the film is especially bothersome when the film is to be used for special effects, or is to be shown on large screens, since even the slightest distortion of the film will then result in unsteady projection. In addition, tension on the film at the roller locations may cause scratching of the film base and the emulsion, and may tend to break the film at a splice or imperfection in the film base.

The general object of the present invention is to provide a novel type of film advancing roller system for a developing unit, which system is so designed as to eliminate all possibility of the development of excessive tension on the film. As will appear, the film in the present apparatus is advanced in a manner such that the film inherently engages the rollers in a very loose relationship, which automatically adjusts itself to assure proper propulsion of the film through the apparatus, without ever allowing the engagement of the film to become tight enough to create any real tension on the film. This result is achieved by varying the effective linear speeds or velocities at which the film engaging portions of the different drive rollers move. More particularly, one of the rollers which is positioned at a location beyond most of the other rollers along the path of film movement is designed to drive the film at a linear speed which is slower than a preceding roller, and which is desirably slower than all of the preceding rollers. In one form of the invention, this reduced linear speed is attained by predetermining the diameter of the slower drive roller relative to the diameters to the other rollers in a manner introducing the desired differential rate of movement. The preceding rollers then tend to advance the film at a rate faster than it can be taken by the final slow roller, and this differential automatically maintains the film in a slightly slackened condition. If the film becomes too slack, then the preceding rollers commence to slip slightly with respect to the film, and in this way always maintain an optimum slightly slack relation between the film and rollers.

The tension problems in the past have been most difficult at and beyond the location at which the film is dried, since drying of the film causes it to shrink considerably, and thereby tends to increase the pull exerted by the film on the rollers. Consequently, it is preferred that the reduced linear speed roller of the present invention be positioned beyond the drying apparatus in the direction of film travel. If desired, the linear speeds of a series of driven rollers may vary progressively through the entire apparatus, typically by increasing the effective linear speeds of successive rollers through the portion of the apparatus in which the film is passing through liquids, and is therefore expanding longitudinally, and then progressively decreasing the linear speeds during the drying operation.

Instead of employing rollers of fixed diameter, and therefore fixed effective linear drive speeds, I may utilize one or more rollers of automatically variable diameter, adapted to respond to the development of excessive tension on the film, in a manner automatically decreasing the effective diameter of the roller or rollers and thereby relieving the developed tension.

The above and other features and objects of the present invention will be better understood from the following detailed description of the typical embodiments illustrated in the accompanying drawings in which:

FIG. 1 is a side view, partially broken away, of a film developing unit constructed in accordance with the invention;

FIG. 2 is a plan view, partially broken away, of the FIG. 1 apparatus;

FIG. 3 is an enlarged fragmentary section taken on line 3—3 of FIG. 1;

FIG. 4 is a fragmentary perspective view of one of the film guiding units of the device;

FIG. 5 is an enlarged fragmentary side view taken on line 5—5 of FIG. 2;

FIG. 6 is an enlarged fragmentary representation of the lower portion of one of the film guiding units;

FIG. 7 is a view similar to FIG. 6, but showing a slightly variational type of guide unit;

FIG. 8 is a view representing a type of automatically adjustable tension responsive roller which may be utilized in a variational form of the invention; and FIG. 9 is a fragmentary representation of a unit in which the roller of FIG. 8 may be employed.

Referring first to FIGS. 1 through 6, and particularly to FIGS. 1 and 2, there is represented generally at 10 a film developing unit constructed in accordance with the invention, and adapted to perform all of the developing, drying, rinsing, and drying operations required for complete developing of a strip of film 11. This film may in most instances be a motion picture film, of any conventional size, or it may be a strip, or series of interconnected strips, of film from a "still" camera. The film 11 is advanced through the apparatus along a predetermined path, which carries the film successively through a series of vertical parallel tanks 12 within which the various developing and other operations are performed. These tanks 12 all contain liquid with the exception of a final group of tanks, typically the two tanks designated 12' in FIG. 1, in which final tanks the film is dried. The film is directed along its circuitous path through the various tanks 12 by means of a film holding and guiding assembly which is represented generally at 13 in FIG. 1, and which is adapted to be raised upwardly by a power operated hoist or other means diagrammatically represented at 14, to a position in which the film and its guiding parts are completely out of the tanks 12 and are therefore accessible for very rapid and easy threading of the film onto the guide rollers. The entire apparatus may be contained within a suitable light-tight housing 110 having a cover 111 which is removable upwardly to allow access to the interior of the housing.

Tanks 12 may be of straight cylindrical configuration, with their vertical axes 15 extending parallel and typically being aligned within a common vertical plane. The lower ends of the tanks may be closed by a horizontal bottom wall 16 of the housing, while the upper ends of the tanks are open.

Suitable means are provided for circulating through each of the tanks (except for the drying tanks), a proper treating liquid. This liquid may be introduced into the lower end of each tank through a line 17, and be discharged from the upper end through a discharge line 18, leading to a storage tank 19, with the circulation of fluid being maintained by a pump being represented at 20. Associated with this recirculation system, there may of course be provided suitable means for continuously or intermittently replenishing the liquid. Each of the tanks may be considered as having its own separate fluid circulating system, or in instances in which the same liquid is to be used within a series of tanks, a common circulating system may be employed for all of those tanks.

When only a black and white type film is to be developed, there may be provided only five of the tanks 12 in the entire system. The first four of these tanks would then contain respectively a developer fluid, washing water, a fixing bath, and a second washing water bath. The fifth tank could then serve the function of drying the film. When color film is to be developed, there may be provided a greater number of the tanks (typically thirteen such tanks), for performing all of the numerous operations which must be carried out in developing such film. Also, if both black and white and color film are to be developed in a common device, all of the various black and white and color solutions may be provided, and the film may then be threaded past any of the tanks which are to be skipped in a particular developing operation. The drying tank or tanks, such as 12' in FIG. 2, are provided with means for blowing heated air through the tanks, these means typically including a blower 119 creating a flow of air through a heater 120 and into the lower ends of tanks 12' at 21, so that the air may flow upwardly through the tanks and out the upper ends thereof to dry the film before it leaves the second of the dryer tanks.

The film holding and guiding unit 13 includes an upper horizontally elongated rigid carrier part 28, typically taking the form of a metal plate lying in a vertical plane. To this plate 28 there are rigidly attached a series of downwardly projecting parallel divider parts 29, one of which is received within each of the tanks 12 (but not drying tanks 12'), in the FIG. 1 active condition of the apparatus. Member 28 also carries a series of film guide rollers 30, 31, 32, 33, 34, 35, 36, 37, 38, 39, 40, 41, 42, and 43. These rollers are mounted to plate 28 for rotation about a series of individual parallel horizontal axes 131, which axes may lie in a common horizontal plane, as shown. For thus mounting the rollers, each roller may have a shaft 132, rigidly attached to and carrying the associated roller, and journaled in and projecting through a suitable bearing 133 mounted to plate 28 (see FIG. 3). Some or all of the rollers are positively driven by means of these shafts 132, an arrangement typically being illustrated in which all of the various rollers are thus driven. However, it is to be understood that in some instances only alternate ones of the rollers may be driven, or perhaps even fewer rollers where the depths of the tanks may not be excessive. The rollers may be driven by means of a motor 44 driving a chain 45, which in turn drives a sprocket wheel 46 attached to a shaft 47 (see FIG. 2). This shaft 47 may carry a second sprocket wheel 48, driving a chain 49 and sprocket wheel 50 attached to the shaft 132 of roller 43. This same shaft may carry a second sprocket wheel 51 driving a chain 52, which engages and drives additional sprocket wheels 51 attached to all of the other shafts 32 of the various rollers 30 through 42. Thus, all of the various rollers in the illustrated apparatus are positively driven in timed relation to one another by motor 44 and the discussed chain drive.

As the film advances through the apparatus, it commences at a feed reel 53, from which it first may pass through a pair of initial rollers 54, and then pass across the upper side of the first of the previously mentioned rollers 30. From roller 30, the film passes downwardly in the first tank at one side of the part 29 located therein, and then advances upwardly at the opposite side of part 29 for engagement with the next successive roller 31, following which the film passes through the other tanks 12 in succession in the same manner described in connection with the first tank. Each of the parts 29 carries at its lower end an additional roller 55, with all of these rollers 55 being mounted to their respective parts 29 for rotation about individual horizontal parallel axes 56 lying in a common horizontal plane. As will be apparent, when the film 11 reaches the lower end of one of the parts 29, the film passes about the underside of the associated lower roller 55, before advancing upwardly at the opposite side of part 29. When the film leaves the final drying tank 12', the film passes about the upper side of roller 42, then about the upper side of roller 43, and onto a takeup reel 57 driven by motor 44. The supply and takeup reels 53 and 57 as well as motor 44, and the associated sprockets etc., are all mounted to plate 28 as by connection to end flanges 59 of the plate. The final roller 43 may have its outer surface formed of rubber or other relatively high friction material, and may be externally cylindrical, to have a high friction direct drive engagement with the film. The film may be held downwardly against the upper surface of roller 43 by an additional roller 60, typically mounted to an arm 61 pivoted to plate 28 at 62, with the arm being yieldingly urged downwardly by spring 63 toward roller 43. The drive between shaft 47 and takeup reel 57 may be a slipping clutch arrangement of the type well known to the motion picture industry, to prevent the development of tension on the film by the takeup reel.

Referring now particularly to FIGS. 3 and 4, it is noted that each of the parts 29 located within one of the tanks 12 is of uniform cross section along its entire vertical extent, that cross section being the same as is shown in FIG. 3. This part 29 acts as a partition member, functioning to form along its opposite sides two vertically extending parallel fluid filled spaces or passages 64 and 65, through which the film passes first downwardly, and then upwardly as it advances through the tank 12. To define the inner sides of these passages 64 and 65, part 29 has two vertically extending opposite side walls 66, which are in horizontal section of the concave configuration represented in FIG. 3. More particularly, these walls 66 preferably curve arcuately in horizontal section with a curvature which may be the same as, but the reverse of, the curvature of the cylindrical wall of the associated tank 12. Side walls 66 may be joined together at their opposite ends by two arcuate walls 67, which curve along the inner surface of, and substantially engage, the wall of tank 12. At its upper and lower ends, the hollow part 29 is closed by two horizontal top and bottom walls 68. The treating fluid or washing water contained within each of the tanks 12 normally substantially completely fills both of the spaces 64 and 65 at opposite sides of part 29 in the tank.

Each of the lower rollers 55 may be mounted to its respective member 29 by means of an essentially U-shaped mounting bracket 69 rigidly attached to and projecting downwardly beyond the bottom wall 68 of member 29. Each of the rollers 30 through 42 and 55 desirably has an outer film engaging annular surface 70 (see FIG. 3), which in axial cross section, has an arcuate configuration very similar to the arcuate curvature of concave side walls 66 of member 29. These concave surface rollers are preferably so positioned as to direct the film 11 downwardly and upwardly within spaces 64 and 65 at locations which are centered therein, so that the film 11 tends to move vertically along the central portions of spaces 64 and 65. This relation is brought out in FIG. 2, which indicates that the annular concave surfaces 70 of rollers 30 through 42 preferably project somewhat beyond positions of true vertical alignment with the inner surfaces of tanks 12, while the corresponding concave surfaces 70' of rollers 55 project horizontally beyond a position of true vertical alignment with the surfaces of walls 66.

The purpose of the concave configuration of all of the defined roller surfaces (except roller 43), and the surfaces of the tanks and elements 29 which engage the film, is to avoid contact of any of these guiding parts with more than the very edge portions of the film being handled. This is brought out very clearly in FIG. 3, in which it is obvious that the film 11 can only engage the concave arcuate surfaces 70 and 70' of the rollers at the very edges of the film. This is true also of the arcuate surfaces of tanks 12 and walls 66, which form guide passages 64 and 65, and which surfaces cannot possibly engage more than the very edges of the film even if the film becomes very slack in the tanks.

Each of the parts 29 which projects downwardly into one of the tanks 12 may carry a rigid guide loop 71 (see FIG. 4), near its lower end, through which the film passes just before reaching the lower roller 55. This loop may be attached at its opposite ends to the two opposite side portions of U-shaped bracket members 69, with the loop 71 curving in essentially a horizontal plane and at a location spaced inwardly a short distance from the inner surface of tank wall 12. The film passes downwardly within this guide loop 71 (see FIGS. 3 and 4), and then advances into contact with the concave outer guide surface of lower roller 55, to pass thereabout. The loop 71 thus holds the film against movement off of roller 55.

The lower horizontal cross piece portion 72 of U-shaped roller mounting bracket 69 at the bottom of each unit 29 may also have, at its upper side, a concavely curved desirably arcuate surface 73 (see FIG. 6), against which the film may be moved downwardly if the film becomes sufficiently slack in the tank to do so. The curvature or surface 73 prevents engagement of cross piece 72 with any portions of the film except its very edge portions, regardless of how slack the film may become. FIG. 7 shows a variational form of cross piece 72a, in which the film engaging surface of cross piece 72 has two planar surface areas 73a which meet at a central point 173a.

The members 29 are rigidly attached in any suitable manner to carrier plate 28, so that vertical movement of the plate will function to lift these members 29 out of their respective tanks. With reference to FIGS. 3 and 4, this attachment may be effected by means of a laterally projecting lug 74 connected to the upper end of each of the members 29, and carrying a threaded stud 75, adapted to project through an aperture in plate 28 and be retained thereon by means of a nut 76. All of the various parts of the apparatus which contact any of the developer fluids or water are of course formed of a material which is capable of withstanding contact with the particular fluid engaged, without damage. For this purpose, I find it desirable to form the parts 29, rollers 30 through 42, rollers 55, the roller mounting parts, and perhaps tanks 12, of a resinous plastic material, such as polyvinyl chloride.

In the arrangement shown in FIGS. 1 through 6, it may be assumed that all of the power driven rollers 30 through 43 are turned at exactly the same rotary speed. It may also be assumed that the rollers 30 through 42 are all of exactly the same size. The effective diameter of these rollers 30 through 42, with respect to the driven film 11, is therefore the diameter represented at D in FIG. 3, this being the diameter of the concave surfaces 70 of the rollers at the points at which the opposite side edges of the film 11 engage those surfaces. In other words, the diameter D corresponds to the diameter of a cylindrical roller which would drive the film at the same linear speed as that at which the film engaging portions of rollers 30 through 42 travel about the roller axes.

The outer cylindrical surface of roller 43 has a diameter which is slightly less than diameter D of rollers 30 through 42. Thus, the linear speed or velocity of the film engaging surface of roller 43 is slightly less than the linear speed of the film engaging portions of rollers 30 through 42, and as a result roller 43 tends to advance the film at a slower rate than the other rollers. Rollers 30 through 42 preferably have a considerably lower coefficient of friction than roller 43 with respect to the film so that the film can slip easily relative to the film when the latter is in a slackened condition.

In placing the apparatus in use, the unit 13 may first be elevated out of housing 110, and film 11 may then be threaded onto the various rollers in the manner illustrated in FIG. 2. Unit 13 is then lowered into the housing, so that the various elements 29 and their carried rollers and film project downwardly into tanks 12, and motor 44 may then be placed in operation to commence the advancement of the film (assuming that the proper fluids are already being circulated through the tanks, and that heated air is being blown through the final drying tanks 12'). As the film is advanced by the various driven rollers, the concave surfaced rollers 30 through 42 tend to advance the film faster than the final rubber surfaced roller 43, by virtue of the above discussed differential in effective diameters. This differential causes rollers 30 through 42 to tend to feed the film to final roller 43 at a rate faster than roller 43 can take the film. Consequently, slack is introduced into the film throughout the course of its travel. If this slack becomes excessive, then rollers 30 through 42 commence to slip slightly relative to the film, by virtue of the loose engagement of the film with the rollers. In actual operation, an equilibrium develops between the film and the rollers 30 through 42, so that there is a continuous motion of the film, but with considerably less film tension in all of the tanks than in conventional apparatus. This reduced film tension is readily perceptible in operation in the form of a visible enlargement of the film loops over each of the top rollers 30 through 42.

The difference in effective diameter between roller 43 and the preceding dry rollers should be at least great enough to compensate for the shrinkage of the film which occurs in drying tanks 12'. More particularly, the percentage reduction of the diameter of roller 43 relative to the effective diameter of the film engaging portions of rollers 30 through 42 should be at least as great as, and preferably greater than, the percentage reduction in length of the film upon drying in tanks 12'. In practice, this may be a reduction in diameter of between about 1% and 10% depending upon the film tension desired. As will be apparent, the greater the differential between the diameters of roller 43 and the other rollers, the greater will be the effect of the device in reducing tension on the film.

Because all of the surfaces which engage the film within the tanks are concavely curved, as previously discussed, the surfaces of the slack film cannot touch any element which could cause film damage, the only engagement of any part with the wet film being at the very edges of the film. As the slack film advances through the spaces at the opposite sides of partitions 29, the film may wave from side-to-side in those spaces, as is illustrated in exaggerated form in the first tank of FIG. 1. However, even though the film may wave in this manner, it cannot touch either side of the passage except at the edges of the film. Also, if the weight of the film is sufficient to cause it to bend downwardly a substantial distance beneath one of the lower rollers 55, the film still cannot touch any part except at the edges of the film by virtue of the curvature or angularity of surfaces 73, or 73a of FIGS. 6 and 7.

Instead of designing all of the rollers 30 through 42 in a manner such that they tend to drive the film at a common speed, while the single roller 43 drives the film at a slower speed, the various rollers may be designed to tend to drive the film at a series of different speeds varying progressively along the length of the film path. For example, rollers 30 through 40 which engage the film while it is wet may be relatively proportioned to have progressively increasing diameters from the roller 30 to the final roller 40, to compensate for the expansion of the film when wet, and the final rollers 41, 42, and 43, may be proportioned to have progressively decreasing effective diameters, to compensate for the shrinkage of the film upon drying. No attempt has been made to illustrate this variational form in the drawings, beyond the showing of FIG. 1, since the variation in diameters of the rollers would normally be so small as to not be discernable in the FIG. 1 view. Consequently, FIGS. 1 through 6 may be considered as showing this variational form of the invention, as well as the basic form in which all of the rollers 30 through 42 are of a common size. In actual practice, the multiple diameter arrangement is not necessary unless, in a particular situation, it proves desirable to avoid all possible slippage between the drive rollers and the film. In most installations, it is not even necessary to drive all of the upper rollers 30 through 42, but rather a very effective operation can be attained if only every fourth or fifth roller is driven, with the intermediate rollers being idlers. In some cases, it may also be possible to utilize in the place of the final roller 43 a concave roller constructed the same as the preceding drive rollers 30 through 42.

FIGS. 8 and 9 show another variational form of the invention, which may be considered to be identical with that of FIGS. 1 through 6, except in the following respects. Instead of the final two rollers 42 and 43, there is provided a single driven roller 42a, and an idler 43a beneath which the film passes before reaching takeup reel 57a. All of the rollers 41a, 40a, 39a, etc., which precede the final driven roller 42a may be identical with the rollers 30 through 41 of FIG. 1, and may be driven at a common speed. The final roller 42a is driven at that same speed, and is predesigned to automatically respond to the development of tension on the film in a manner decreasing the effective diameter of roller 42a, and thereby creating the same tension relieving linear speed differential which exists between roller 43 of FIG. 1 and its preceding rollers. The chain and sprocket drive between the various rollers of FIG. 9 may be the same as has been described in conjunction with the first form of the invention, to turn all of the rollers at a common rotary speed.

FIG. 8 represents one type of tension responsive roller assembly which may be utilized at the position 42a of FIG. 9. This assembly includes a shaft 132a positively driven by the chain and sprocket drive of the rollers, and carrying two complementray half rollers 142a and 242a. The first of these sections 142a is rigidly fixed to shaft 32a, while the second section or half 242a is attached to shaft 32a by a spline connection (not shown), which keys element 242a to the shaft for rotation therewith, but allows relative axial movement of element 242a to the broken line position of FIG. 8 against the resistance offered by a spring 80 bearing against a stop element 81. The tapered outer film engaging surfaces 82 of sections 142a and 242a form together a concave annular surface which engages only the edges of the film in a manner similar to that attained by the previously discussed concave rollers. Also, the diameter of the film engaging portions of surfaces 82 decreases as section 242a is urged away from section 142a, to thereby decrease the linear speed at which the film is driven by roller 242a.

When the device of FIGS. 8 and 9 is in operation, any excessive tension developed on the film 11a causes roller sections 142a and 242a to spread relatively apart, against the tendency of spring 80, to thereby introduce a differential between the rate of linear movement of the film engaging portions of roller 42a, and the rate of linear movement of the preceding rollers 41a, 40a, etc. Thus, the film develops a slackened condition, such as that described in conjunction with the first form of the invention, and the film is thereby protected against damage induced by excessive tension as it passes through the developing apparatus. To attain a proper tension relieving action of the automatic roller 42a in FIG. 8, spring 80 is so selected that the force exerted thereby allows for just sufficient resistance to spreading of the roller halves to produce a proper differential and roller speed in response to the development of a predetermined relatively slight tension in the film.

In addition to the various different forms of the invention discussed above, still another form is possible in which rollers such as the one shown at 42a in FIG. 8 are utilized at all of the various driven roller locations, 42a, 41a, 40a, 39a, etc. of FIG. 9. In such an arrangement, each of the various rollers responds individually to development of more than a predetermined very slight amount of tension at that particular roller location, so that optimum slack film conditions are maintained throughout the apparatus.

I claim:
1. Apparatus for developing an elongated strip of film comprising means for directing said film along a predetermined path first through developing fluid to be developed thereby and then through a drying zone, said means including a series of rollers having portions engaging the film at a series of locations spaced along said path and power operated means for driving a plurality of said rollers, said rollers and said power operated means being constructed to cause the film engaging portions of the different rollers to progressively increase in effective linear speed as the film advances through said fluid and then progressively decreases in effective linear speed in said drying zone.

2. Apparatus for developing an elongated strip of film comprising a series of vertically extending tanks for containing film treating fluids, and a film holding structure having a plurality of partitions removably receivable in said tanks and projecting downwardly therein and adapted to pass the film downwardly at one side of each partition and then upwardly at its opposite side, rollers carried by said partitions near the lower ends thereof and about the undersides of which the film passes, and generally horizontal guide elements carried by said partitions at locations spaced beneath said rollers and having upwardly facing surfaces engageable with the film and which are concave to engage only the film edges.

3. Apparatus for developing an elongated strip of film comprising means for holding treating liquid, means forming a drying zone, guide means for directing said film along a predetermined path first through said liquid and then through said drying zone, said guide means including a series of first rollers having portions engaging the film at a series of locations spaced along the path, and including a subsequent roller having a portion engaging the film at a location beyond said first rollers, and power operated means for driving said first rollers and said subsequent roller to advance the film, said first and subsequent rollers and said power operated means being constructed to cause the film engaging portion of said subsequent roller to turn at a linear speed which is slower than that of each of said first rollers, said portion of said subsequent roller being engageable with said film in a positive non-slipping driving relation to advance the film positively and continuously at said slower speed, said portions of said first rollers being engageable with said film with a less positive drive between the film and the film engaging portions of the first rollers than between the film and said subsequent roller, so that the film may slip with respect to said surfaces of the first rollers but not with respect to said subsequent roller upon the development of predetermined slack in the film.

4. Apparatus as recited in claim 3, in which said liquid holding means and said means forming a drying zone include a series of vertically extending tanks, containing a series of film treating liquids, and at least one of which forms said drying zone, said guide means including a film holding structure movable vertically relative to said tanks and carrying a plurality of partitions adapted to project downwardly into different ones of the tanks respectively, said series of first rollers being carried by said structure near the upper ends of said partitions, said guide means including a group of second rollers carried by said partitions near their lower ends so that the film may pass downwardly in each tank at one side of the partition therein, then about one of said second rollers, and upwardly at the opposite side of the partition.

5. Apparatus as recited in claim 4, in which said subsequent roller is carried by said structure at a location beyond the last of said tanks and has a high friction film engaging surface of a first diameter, said first and second rollers having concave lower friction film engaging surfaces which at the point of film engagement have a second and slightly greater diameter.

6. Apparatus as recited in claim 4, in which said partitions and tanks have concave film engaging surfaces.

7. Apparatus as recited in claim 3, in which said subsequent roller has a high friction film engaging surface, said first rollers having concave film engaging surfaces adapted to engage the film only at its edges and engaging the film with much less friction than said surface of the subsequent roller.

8. Apparatus as recited in claim 7, including a spring urged additional roller for pressing the film against said high friction surface of said subsequent roller.

9. Apparatus for developing an elongated strip of film comprising means for holding treating liquid, means forming a drying zone, guide means for directing said film along a predetermined path first through said liquid and then through said drying zone, said guide means including a series of first rollers having portions engaging and driving the film at a series of locations spaced along the path, and including a subsequent roller having a portion engaging and driving the film at a location beyond said first rollers and at least as far along said path as the point of film discharge from said drying zone, and power operated means for driving said first rollers and said subsequent roller to advance the film, said first and subsequent rollers and said power operated means being constructed to cause the film engaging portions of all of said first rollers to turn at a predetermined common first linear speed throughout the length passing through the liquid, and also throughout said drying zone up to said point of discharge from the drying zone, and to cause the film engaging portion of said subsequent roller to turn at a second and slower linear speed.

10. Apparatus as recited in claim 9, in which said subsequent roller has a high friction film engaging surface, said first rollers having concave film engaging surfaces adapted to engage the film only at its edges and engaging the film with much less friction than said surface of the subsequent roller.

11. A method of passing continuous strip film first through a series of aqueous solutions in a wet zone and then through a drying zone in a continuous manner comprising: subjecting a continuous strip of film to frictionally applied forwardly directed impulses simultaneously at a series of uniform speed drive points spaced along both said wet zone and said drying zone by contacting the film with a series of positively driven rollers at said points, the forwardly directed impulses to which the film is subjected having a predetermined forwardly directed speed component at all of said drive points throughout said wet zone and having the same forwardly directed component at all points throughout said drying zone up to the point of discharge of the film from said drying zone, and subjecting said film to frictionally applied forwardly directed impulses at a location at least as far along the film path as said point of discharge from the drying zone by contact with another driven roller at said location, the impulses applied by said last mentioned roller having a forwardly directed speed component which is less than said forwardly directed component applied to the film at said series of uniform speed drive points in advance of said point of discharge from the drying zone.

12. Apparatus for developing an elongated strip of film comprising means for directing said film along a predetermined path through developing fluid to be developed thereby and then through a drying zone, said means including a series of first rollers having portions engaging the film at a series of locations spaced along said path, power operated means for driving said rollers, and a subsequent power driven roller assembly engaging and advancing the film at a point beyond said first rollers and including two opposed roller sections having tapering film engaging surfaces and yieldingly urged relatively toward one another and actuable relatively apart to reduce the effective diameter of the assembly in response to film tension.

References Cited in the file of this patent

UNITED STATES PATENTS

| | | |
|---|---|---|
| 1,890,026 | Barkelen | Dec. 6, 1932 |
| 2,244,170 | Miketta | June 3, 1941 |
| 2,538,270 | Pratt | Jan. 16, 1951 |
| 2,618,210 | Mayer | Nov. 18, 1952 |
| 2,648,280 | Pohl | Aug. 11, 1953 |

FOREIGN PATENTS

| | | |
|---|---|---|
| 990,898 | France | June 13, 1951 |